(12) United States Patent
Sviestins

(10) Patent No.: US 6,359,586 B1
(45) Date of Patent: Mar. 19, 2002

(54) BIAS ESTIMATING METHOD FOR A TARGET TRACKING SYSTEM

(75) Inventor: Egils Sviestins, Sollentuna (SE)

(73) Assignee: Saab AB, Linkoping (SE)

( * ) Notice: Subject to any disclaimer, the term of this patent is extended or adjusted under 35 U.S.C. 154(b) by 0 days.

(21) Appl. No.: 09/530,666

(22) PCT Filed: Oct. 26, 1998

(86) PCT No.: PCT/SE98/01927

§ 371 Date: May 3, 2000

§ 102(e) Date: May 3, 2000

(87) PCT Pub. No.: WO99/23506

PCT Pub. Date: May 14, 1999

(30) Foreign Application Priority Data

Nov. 3, 1997 (SE) .................................... 970412

(51) Int. Cl.$^7$ .......................... G01S 3/02; G01S 13/00
(52) U.S. Cl. ...................... 342/451; 342/195; 342/59
(58) Field of Search .................... 342/465, 59, 195, 342/189, 451

(56) References Cited

U.S. PATENT DOCUMENTS 4,713,768 A 12/1987 Kosaka et al.
5,313,212 A 5/1994 Ruzicka

FOREIGN PATENT DOCUMENTS

DE 31 32 009 3/1983

OTHER PUBLICATIONS

Krieg, Mark L. et al, "Comparison of Probabilistic Least Squares and Probabilistic Multi–Hypothesis Tracking Algorithms for Multi–Sensor Tracking", 1997 IEEE International Conf. on Acoustics, Speech and Signal Processing, Apr. 1997, pp. 515–518.*

Sviestins, Egils. "Multi–Sensor Tracking for Air Traffic Control and Air Defense." ATC Systems, Jan. Feb. 1995, pp. 10–16.

Wigren, Torbjorn et al. "Operational Multi–Sensor Tracking for Air Defense," DataFusion Symposium, 1996. ADFS '96., pp. 13–18, Nov. 21–22, 1996.

S.S. Blackman, "The Basics of Multiple–Target Tracking", *Multiple–Target Tracking With Radar Applications*, Artech House, Inc. USA, 1986, pp. 1–17 and 357–393.

S. Blackman et al., "Track Association Using Correction For Bias and Missing Data", *SPIE–The International Society For Optical Engineering*, vol. 2235, 1994, pp. 529–539.

R. Helmick et al., "One–Step Fixed–lag IMM Smoothing For Alignment of Asynchronous Sensors", *SPIE–The International Society For Optical Engineering*, vol. 2235, 1994, pp. 507–518.

H. Leung et al., "Least Squares Fusion of Multiple Radar Data", *Proceedings of the International Conference On Radar*, vol. 3, No. 4, May 1994, pp. 364–369.

* cited by examiner

*Primary Examiner*—Gregory C. Issing
(74) *Attorney, Agent, or Firm*—Young & Thompson

(57) ABSTRACT

The present invention is in general related to automatic alignment in multi-sensor target tracking. The process of the invention repeatedly generates estimates for sensor bias errors (b) by minimising a function, given on one hand by the magnitude of the discrepancy between measurements (M) and a measuring model, where the measuring model is a function of the unknown target location and unknown bias parameters, and on the other by the bias parameters and their predetermined statistical distributions (15). In a preferred embodiment of the present invention, the minimizing step is performed by linearising components of the function around an approximate target position (normally obtained from the tracker (10)) and around nominal (typically zero) bias errors, and the function is subsequently minimized with respect to target positions as well as to the bias parameters (b). In addition, possible time dependence of the bias parameters are modelled by the incorporation of process noise.

23 Claims, 6 Drawing Sheets

BIAS ESTIMATING METHOD FOR A TARGET TRACKING SYSTEM

TECHNICAL FIELD OF THE INVENTION

The present invention relates in general to tracking of targets by means of measurements from various sensors and in particular to automatic sensor alignment.

PRIOR ART

Target tracking is the process by which the location and motion of objects like aircraft, ships, missiles, etc., are established and presented to users, for example, situated at a command and control centre. The detection of the targets is accomplished by one or more sensors. The most widely used sensor for targets in the air is the radar. However, radars are not the universal solution since they are impaired by serious inherent drawbacks. At the state of the art, their accuracy is limited. Moreover, they can't be used under water. Additionally, by radiating energy, radars reveal their locations and form easy targets for enemy forces. Depending on the particular application, one therefore uses other types of sensors instead of or in complement of radars. Examples of such sensors, which, however, should not be considered as a complete set of possibilities, are Global Navigation Satellite System (GNSS) and its predecessors GPS and GLONASS, Electronic Support Measures (ESM) equipment, Electro-Optical (EO) sensors and their subclass Infrared Search and Track (IRST), Jam strobe detectors (ECM), air pressure based altitude measuring equipment downlinked via 'Secondary Radars' (Mode C), as well as active and passive sonars. Out of these sensors, only certain radars (3D) and the satellite based navigation data provide full three-dimensional determination of the target location. ESM, EO, IRST, ECM, and passive sonars only give the direction to the target. Such measurements are referred to as "strobes".

The sensors produce measurements at regular or irregular time intervals. A measurement is a piece of information including e.g. range and azimuth of the target. A tracker is a device, which will create a track file for each detected target. A track is a set of usually filtered data which are associated with a certain target. The tracker updates the track data with incoming measurements in such a way that measurement noise is reduced by filtering, and speed and heading is computed. The track is given a label and is presented to the operators. The general art of tracking is well known and can be found at many different places, e.g. in S.S. Blackman "Multiple-Target Tracking with Radar Applications", Artech House, Inc, MA, USA 1986, in particular pages 1–17 and 357–393.

There are many reasons to use multiple sensors for target tracking. Evidently, the combination of passive sensors at different locations makes it possible to obtain the distance to the target. By using several radars, gaps in coverage of individual radars may be eliminated. Moreover, satellite data will improve accuracy, if available. ECM gives information even if a jammer on the target makes the radar data useless, and so forth. In general, several sensors contribute to more frequent updates, better accuracy, higher signal to noise ratio, and more reliable tracking.

There is, however, a serious problem in combining data from several sensors: alignment errors, also known as systematic errors, bias errors, or registration errors. The alignment errors may give the impression that the number of targets is larger than the actual number because the measurements are displaced by some, often very significant, amount. Even if there is only one track per target, accuracy will clearly be impaired. Therefore, estimation and compensation of the bias errors are necessary for successful tracking.

To illustrate these problems, a simple example will be discussed. FIG. 1 shows an example of a tracking situation. The tracking system have measurements available from two 3D sensors, $D_1^3$ and $D_2^3$, respectively, providing range, azimuth as well as height information, and one passive sensor $D^1$, only providing azimuth angle measurements. One true target X is present in the area covered by the system. The sensors exhibit some systematic errors. The local coordinate system of sensor $D_1^3$ is misaligned with respect to the common coordinate system with a certain angle $\alpha$. The sensor $D_2^3$ has an error in the range measement, which gives rise to systematic errors in the range values. In the situation in FIG. 1, sensor $D_1^3$ detects a target in the direction of a real azimuth angle $A_{R1}^3$, but due to the misalignment, the apparent azimuth angle $A_{A1}^3$ is shifted an angle $\alpha$, so the apparent location for the detected target is $M_1^3$. The range measuring error of sensor $D_2^3$ causes the apparent target position as measured by sensor $D_2^3$ to be $M_2^3$, offset a distance r along the azimuth angle from the true position. Sensor $D^1$ provides a true azimuth angle measurement. In this situation, it is probable that a target tracking system will interpret the situation as if two targets are present, at $M_1^3$ and $M_2^3$. The $M_1^3$ position is reasonably consistent with measurements from both $D_1^3$ and $D^1$, while the $M_2^3$ position is far away. From this example it is obvious that there is a need for some alignment procedure.

It turns out that the bias estimation or automatic alignment is quite a difficult task, and it is further complicated by drifts in electronic and/or mechanical systems, which call for recurrent recalibration. The methods existing so far have various severe limitations. Some approaches according to prior art are described below.

A first approach concerns estimating and compensating for the deviations in x, y and z for each single track separately. The patent DE 3,132,009 gives an example of this approach. The drawback is that the estimation process is initiated for each track, and it may take considerable time before the estimates are good enough for accurate tracking.

Most other methods aim at modelling each sensor with a set of bias parameters. In this document, the term "bias parameters" is used for parameters, each of which represents a characteristic of the sensor like a location error, a north alignment error, or a range offset etc. Another term used in the literature, basically denoting the same measures, is "registration errors". Most methods according to the state of the art handle a very limited set of sensor types and a very limited set of parameters.

A second approach of automatic alignment uses the above described principle which is applied by using reference targets with exactly known positions. By comparing a set of measured positions with a set of true positions one can adapt the bias parameters so that the deviations are minimised. There are, however, severe disadvantages. The positions of the reference targets have to be measured very accurately. The position of the reference target should optimally also be situated somewhere in the volume, where normal targets appear, which often may be over sea or even over international or other nations territories. Fixed reference targets with well defined positions are also normally restricted to ground level or close to ground level, which makes calibrations of altitude and inclination measurements difficult to perform. Moreover, reference targets are also easily destroyed or manipulated with during hostile situations.

In the absence of reference targets, a third approach involves designation of one of the sensors as a reference sensor, and alignment of the others with respect to the reference. One example of such a system is found in the proceedings of the SPIE—The International Society for Optical Engineering, Vol. 2235, 1994, in an article in the name of R. Helmick et al, with the title "One-step fixed-lag IMM smoothing for alignment of asynchronous sensors", pages 507–518. Here a method for compensating a number of 3D sensors is disclosed. Each sensor has its own tracker and the filtered data is brought to a common time. One sensor is selected as a master and the tracks of the other sensors are compared with the master to calculate correction factors. This method requires 3D sensors since each sensor has its own complete track. Furthermore, the selection of a master also presents problems if it happens to have relatively large systematic errors itself or if it at any occasion is not working properly, problems which are common for all systems working according to this approach. Finally, this particular method does only discuss range, north alignment, inclination and altitude errors of the sensors.

In the above described example, shown in FIG. 1, it is obvious that neither sensor $D_1^3$ nor sensor $D_2^3$ are suitable as reference sensors. Furthermore, sensor $D^1$ can not be used as reference, since it is unable to provide a complete target track on its own.

There are also methods in prior art, which do not to have one sensor as reference or do not use a reference target. These methods may be collected in a fourth approach. Bias parameters will then be estimated for all the participating sensors. In the proceedings of the International Conference on Radar, Paris May 3–6 1994, an article with the title "Least squares fusion of multiple radar data", page 364–369, in the name of H. Leung et al discloses such a method for bias compensation of data from two 2D radars. Values of the range and north misalignment errors, which gives the lowest feast squares discrepancy for the radar measurements, are calculated. Poorly conditioned systems of equations are handled by singular value factorisation. Only one single pair of 2D radars is discussed, and only range and north misalignment errors are compensated for.

In "Maximum Likelihood Registration of Dissimilar Sensors" by Daniel W. McMichael and Nickens N. Okello, Proceedings of First Australian Data Fusion Symposium (ADFS-96), Adelaide November 21–22, 1996, page 31–34, another method for automatic alignment of this approach is disclosed. The method comprises a procedure for maximising a probability function using a maximum likelihood approach. The procedure is performed in an iterative manner to obtain a requested accuracy. The disadvantages with this particular method is that it does not give any clue about how to use measurements performed at different times. The method is furthermore an off-line method, since it does not handle any time propagation features.

In general, systems according to the fourth approach, that do not have a reference sensor tend to give ill-conditioned estimation problems as will be explained in the sequel, and one has to be very restrictive in the selection of bias parameters.

In prior art, there are also techniques which are somewhat similar, but not directly related to the present scope of concerns. In the U.S. Pat. No. 5,208,418, the relative alignment of sensors for different weapons are discussed. It discloses a method for compensation of solely misalignments between pairs of sensors and guns. The method does not concern multi-sensor tracking. The U.S. Pat. Nos. 5,072, 389 and 5,245,909, disclose methods for compensation of dynamic, rapidly changing errors using accelerometers, which are not of interest within the scope of the present invention.

SUMMARY OF THE INVENTION

An object of the present invention is to provide a method for sensor alignment, which is not limited by the use of a fixed reference sensor or reference target, and which is applicable to all combinations of sensors, passive or active.

Another object of the present invention is to provide a method for sensor alignment, which is able to estimate a large set of bias parameters.

Yet another object of the present invention is to provide a method for sensor alignment, which provides updated estimates whenever requested, regularly or occasionally.

Still another object of the present invention is to provide a method for sensor alignment, which enables handling of each bias parameter with individual time characteristics.

The objects of the present invention is achieved by a process exhibiting the features set forth in the claims. The process of the invention repeatedly generates estimates for sensor bias errors by minimising a function, given on one hand by the magnitude of the discrepancy between measurements and a measuring model, where the measuring model is a function of the unknown target location and unknown bias parameters, and on the other by the bias parameters and their predetermined statistical distributions. In a preferred embodiment of the present invention, the minimising step is performed by linearising the function around an approximate target position (normally obtained from the tracker) and around nominal (typically zero) bias errors, and the function is subsequently minimised with respect to target positions as well as to the bias parameters. In addition, possible time dependence of the bias parameters are modelled by the incorporation of process noise.

DRAWINGS

Embodiments according to the present invention are presented in detail in the following, in connection with the associated drawing, in which.

DETAILED DESCRIPTION

In a general tracking system, a target track is normally generated in some stage of the process. The target track is determined by a number of parameters, such as position, velocity, acceleration etc., which normally are results of some kind of filtering process. Certain measurements from the individual sensors are possible to associate with a certain target track. The target tracks are intended to correspond to true targets.

Figure 1:
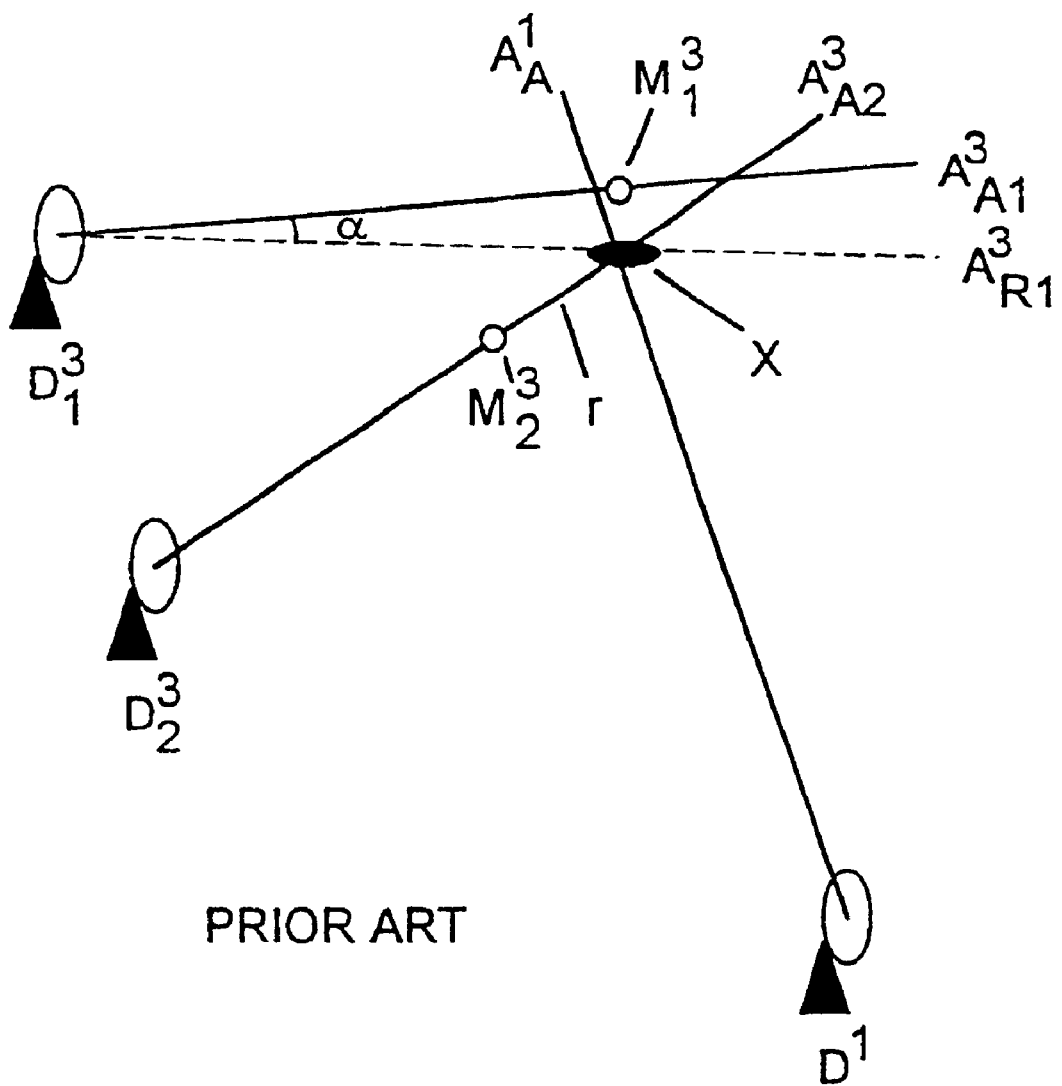
FIG. 1 illustrates a tracking situation where automatic alignment is not applied.
Figure 2:
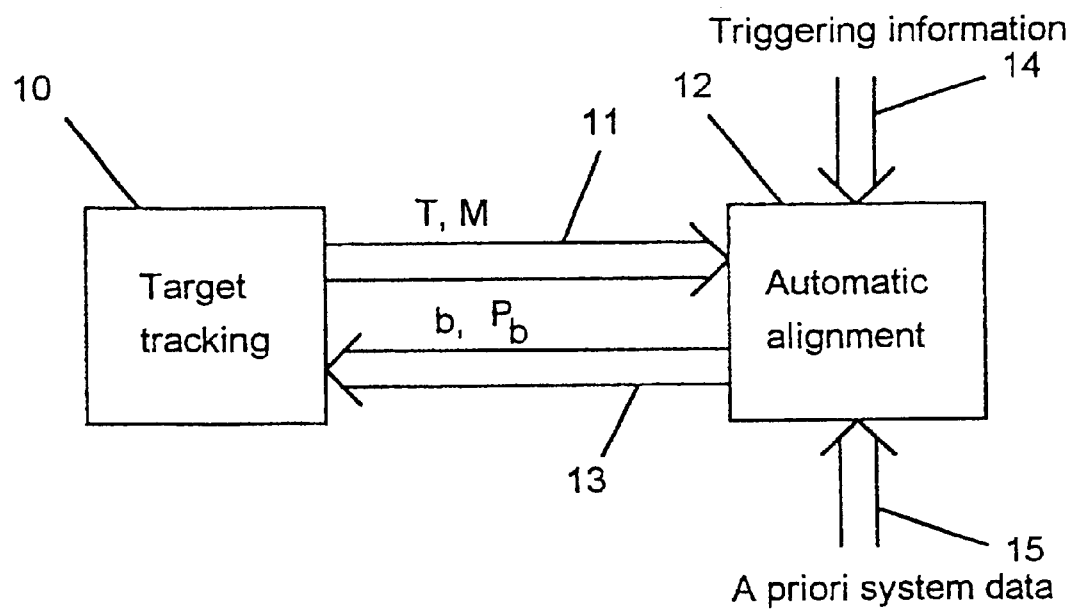
FIG. 2 shows a block diagram illustrating the flow of information in a tracking system comprising an automatic alignment function according to the present invention.

The method according to the present invention, which will be described in detail below, provides an automatic alignment procedure, featuring several attractive properties. In FIG. 2, a target tracking system comprising an embodiment of the present invention is illustrated. A target tracking section 10 performs the actual target tracking, which among other things generates target tracks T and measurements M associated to these target tracks T. This information is transferred 11 to an automatic alignment section 12, which generates estimated values of bias parameters b and preferably also their associated covariances $P_b$. This information is retransferred 13 back to the target tracking section 10. Although bias compensated measurements are used for the tracking, the corresponding measurements M entering the alignment procedure have uncompensated values. Except for this exchange of information 11 and 13, the alignment procedures are performed separately from the target tracking section 10, which means that the process according to the invention may be used together with any tracking system which provides target tracks T and associated measurements M. Besides the contribution from the target tracking section, the input to the automatic alignment section 12 comprises various triggering information 14 and a priori system data 15, which will be described more in detail below.

The method according to the present invention is based on comparing the measurements with the true positions in measurement space. The measurement space is given by the coordinates used by the sensor in question—range and azimuth for a 2D radar; height above earth for mode C data; latitude, longitude, and height for satellite navigation data; etc. The true positions are transformed to the measurement space for a comparison. Of course, the true positions are in general unknown, and according to the present procedure, these are regarded as parameters to be eliminated in the minimisation process.

The various parameters in an error model are referred to as the bias parameters. The most important parameters tend to be range offset (for active sensors), north alignment, sensor location (north, east) error, timing error, and range gain errors. Range offset and range gain errors will make data to appear farther away or closer than the true position, and the location errors may shift the data in north-south and east-west directions, respectively. An error in the north alignment will shift the azimuth data and a timing error will cause the data to be delayed or time tagged at a wrong time. There are also various errors in axis or sensor tilting that can be important for sensors with low measurement noise, such as axis tilt (north, east), antenna roll as well as antenna pitch. The axis tilt errors may cause data to appear to high or low in north-south and east-west directions, respectively. An antenna pitch error will make data appear at a too high or too low elevation, and an antenna roll error will shift data clockwise or counterclockwise at high elevations. Mode C data will give incorrect altitudes as they relate to a standard air pressure. The selection of the bias parameters may of course be different, e.g. the sensor position bias parameters may be expressed in a coordinate system other than east/north.

For each sensor s, a vector of bias parameters $b_s$ is introduced, whose components are the parameters (e.g. range offset, etc.) to be estimated. The vectors corresponding to the different sensors are not necessarily of the same type and may subsequently have different sizes and different components.

It is convenient to stack all the $b_s$ vectors into one large bias vector $$b = \begin{pmatrix} b_1 \\ b_2 \\ \vdots \end{pmatrix} \qquad (1)$$

A set of measurements of one target stemming from different sensors is denoted a bias observation, and given an index i. The measurements should be made at nearly identical times (time differences typically less than the measurement period of the sensors). The true target location when sensor s obtained the measurement belonging to bias observation i is written $x_{is}$. This location is mapped onto the measurement space of the sensor by the projection function $h_s(x_{is},b)$. This function thus expresses the target location in measurement space, when bias errors are included. (If the bias vector includes a timing error, the projection function should also include target velocity. This will not be written explicitly in the sequel.) The measurement will also be subject to a random displacement, the measurement noise $\epsilon_{is}$, so the actual measured position $y_{is}$ is possible to express as $$y_{is} = h_s(x_{is}, b) + \epsilon_{is} \qquad (2)$$

Here $y_{is}$ and the function $h_s$ are knowns, while $x_{is}$, b and $\epsilon_{is}$ are unknowns. The measured position will now be compared to the model (2), and b (and implicitly $x_{is}$) is found through a minimisation procedure. In this comparison it is useful to employ the known variances of the measurement noise:

$$R_{is} = E(\epsilon_{is}\epsilon_{is}^T) \qquad (3)$$

where E is the expectation operator and the noise is assumed to have zero mean. For purposes of the present invention it is, however, more convenient to use its inverse, the information matrix $u_{is} = R_{is}^{-1}$. The advantage of this is that a sensor giving, e.g., azimuth only can be assigned zero information for the other components, and subsequently the same algorithm can be used for 2D and 3D radars, and 1D and 2D passive sensors.

The goal for the optimisation procedure is to find the b (and $x_{is}$) which minimises the discrepancy between measurements $y_{is}$ and the projected target location. A candidate for an expression to be minimised with respect to b and $x_{is}$ is thus $$V = \sum_{i,s} \|y_{is} - h_s(x_{is}, b)\|^2 \qquad (4)$$

The norm is defined such that for any vector q, $\|q\|^2 = q^T u q$. However, the different $x_{is}$ pertaining to the same bias observation are not independent. They can be expressed as $$x_{is} = x_i + r_i(t_{is} - t_i) \qquad (5)$$

where $t_{is}$ is the time of the measurement, $t_i$ is a nominal time in the vicinity of the $t_{is}$, $x_i$ is the true position at time $t_i$, and $r_i(\cdot)$ is a function considered to be known. For example, during uniform motion one could write (5) as $x_{is}=x_i+\dot{x}_i \cdot (t_{is}-t_i)$. Combining expressions (4) and (5) yields $$V = \sum_{i,s} \|y_{is} - h_S(x_i + r_i(t_{is} - t_i), b)\|^2 \quad (6)$$

which thus will be minimised with respect to $x_i$ rather than all the $x_{is}$. There is, however, a serious problem. The solutions of the minimising procedure will not in general be unique, and this may later show up as singular matrices and severe instability. This singularity is physical, and singular value decomposition will not help to solve this problem. To illustrate this difficulty, a short example will be described with reference to FIG. 3. Suppose that radar locations are among the bias parameters. Now, if Radar A puts the measurement ($M_A$) 1 km more to the east than Radar B ($M_B$), this could be explained by Radar A being located 1 km east of its nominal position, while Radar B is correct. However, Radar A may instead be correct, while Radar B is located 1 km to the west of its nominal position. Moreover, it could also be that Radar A is located 50 km to the east and Radar B 49 km to the east, and so on. All such combinations would minimise the candidate expression (6). Obviously, the 50/49 km combination is unreasonable, and it is desirable that the algorithm should take that into account.

The means for including such information in the method of the present invention is by a priori uncertainties. The user has the information about something that standard algorithms do not take into account, namely expected variations of the different bias parameters. The inclusion of a priori uncertainties is thus an important part in the present invention. The expression to be minimised is according to the present invention:

$$V = \sum_{i,s} \|y_{is} - h_S(x_i + r_i(t_{is} - t_i), b)\|^2 + (b - \hat{b})^T v (b - \hat{b}) \quad (7)$$

where $v$ is a matrix, typically diagonal, whose components are the inverses of the squared a priori standard deviations of the corresponding parameters. Here $\hat{b}$ stands for a priori values of the bias parameters. In most applications $\hat{b}$ can be chosen to be zero. Note that with the inclusion of the a priori term, it is possible to minimise the expression (7) even at the absence of measurements.

Figure 3:
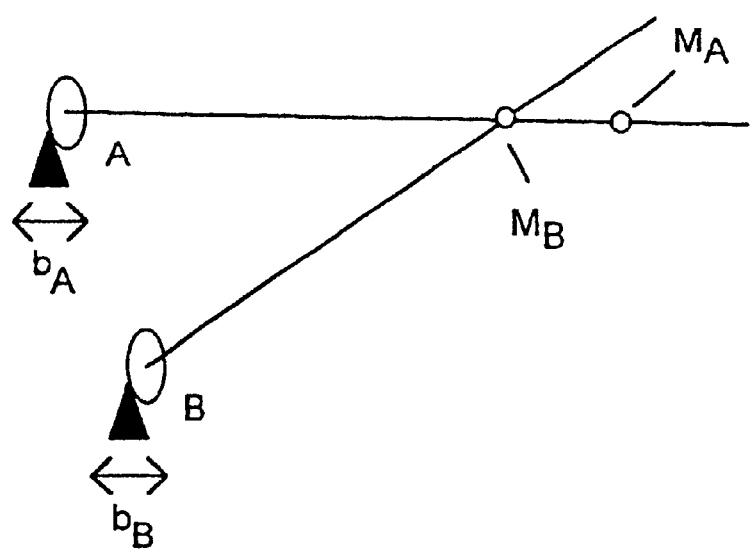
FIG. 3 illustrates a tracking situation presenting a physical singularity.

To illustrate the dramatic improvement in stability that has been obtained, the above discussed example of FIG. 3 will be reexamined. The algorithm according to the present invention will put Radar A 0.5 km to the east and Radar B 0.5 km to the west (provided that the a priori information gives equal uncertainties to both radars). The true values can, of course, not be found without additional data, but this is a reasonable solution that eliminates the relative bias. The effect of the introduction of a priori uncertainties of bias parameters is now clear. The a priori uncertainties introduce "soft boundary conditions" on the system. In this way, the otherwise expected singularities are avoided at the same time as all important parameters are free to vary.

One way of finding the minimum of the expression (7) is to apply some numerical method such as the Levenberg-Marquardt technique, see e.g. William H. Press "Numerical Recipes in Pascal", Cambridge University Press (1989), pages 574–580). However, for real-time applications it is preferable to use a non-iterative method based on linearisation of $h_s$. Thus, in a preferred embodiment, the error function is expanded about a nominal target position $\hat{x}_i$ and the a priori bias vector $\hat{b}$. The efficiency of the algorithm will depend on the validity of the Taylor expansion around these values.

The present invention is intended to work in conjunction with a tracking system. The tracker is suitable for providing the nominal position to perform the Taylor expansion about. However, other means can also be considered, for example, a value computed directly from the measurements by averaging or triangulation. The only requirement is that $\hat{x}_i$ is close enough to the true target position $x_i$ so that the expansion is valid. If the measurements do not coincide in time, an approximation $\hat{r}_t$ of the function $r_t$ is needed. This can be obtained from the track state using its velocity ($\hat{r}_t(\Delta t) = \hat{x}_1 \cdot \Delta t$) or higher order terms.

The first order expansion of $h_s$ runs $$h_s(x_i + r_i(t_{is}-t_i), b) \approx \hat{y}_{is} + H_{is} \cdot (x_i - \hat{x}_i) + A_{is} \Delta b \quad (8)$$

where $$\hat{y}_{is} = h_s(\hat{x}_i + \hat{r}_t(t_{is}-t_i), \hat{b}), \quad (9)$$

i.e., the nominal position projected into the measurement space, $$H_{is} = \left. \frac{\partial h_s(x_i, \hat{b})}{\partial x_i} \right|_{x_i = \hat{x}_i + \hat{r}(t_i - t_{is})}, \quad (10)$$

the Jacobian giving the standard projection matrix, $$A_{is} = \left. \frac{\partial h_s(\hat{x}_i + \hat{r}_i(t_{is} - t_i), b)}{\partial b} \right|_{b=\hat{b}}, \quad (11)$$

which is called the "design matrix", and $$\Delta b = b - \hat{b}. \quad (12)$$

It is now possible to write the expression to be minimised as:

$$V = \sum_{i,s} \|K_{is} - H_{is} X_i\|^2 + \Delta b^T v \Delta b \quad (13)$$

where $$K_{is} = d_{is} + H_{is} \hat{x}_i - A_{is} \Delta b \quad (13)$$

and $$d_{is} = y_{is} - \hat{y}_{is}. \quad (15)$$

Now minimising the expression (13) with respect to all $x_i$, i.e. solving $$\nabla_{x_i} V = 0 \quad (16)$$

yields $$H_{is} x_i = \bar{K}_{is} \quad (17)$$

where the "bar" notation for any vector $q$ is defined as $$\bar{q}_{is} = H_{is} \left( \sum_t H_{it}^T u_{it} H_{it} \right)^{-1} \sum_t H_{it}^T u_{it} q_{it} \quad (18)$$

(There may be occasions when geometry is such that the inverse in the expression (18) cannot be calculated. Such cases should be excluded from the summing in the sequel). By inserting expression (17) into the expression (13) the error function expression runs $$V = \sum_{i,s} \|K_{is} - \overline{K}_{is}\|^2 + \Delta b^T v \Delta b \tag{19}$$

and is now to be minimised with respect to $\Delta b$. Writing (19) more explicitly gives $$V = \sum_{i,s} \|d_{is} - \overline{d}_{is} + H_{is}\hat{x}_i - \overline{H_{is}\hat{x}_i} - A_{is}\Delta b + \overline{A_{is}\Delta b}\|^2 + \Delta b^T v \Delta b \tag{20}$$

Now, after verifying that $\overline{H_{is}\hat{x}_i} = H_{is}\hat{x}_i$, all that remains is $$V = \sum_{i,s} \|d_{is} - \overline{d}_{is} - (A_{is} - \overline{A}_{is})\Delta b\|^2 + \Delta b^T v \Delta b \tag{21}$$

Minimising this expression with respect to $\Delta b$ finally gives $\Delta b$ as the solution of $$(U+v)\Delta b = m \tag{22}$$

where $$U = \sum_{i,s} (A_{is} - \overline{A}_{is})^T u_{is} (A_{is} - \overline{A}_{is}) \tag{23}$$

and $$m = \sum_{i,s} (A_{is} - \overline{A}_{is})^T u_{is} (d_{is} - \overline{d}_{is}) \tag{24}$$

and finally $b = \hat{b} + \Delta b$. The structure of the expressions (23) and (24) facilitates continuous on-line processing: When a bias observation i is available, the corresponding data is added to the matrix on the left hand side and to the array on the right hand side of expression (22). The system of equations can now be solved for $\Delta b$ when needed since all requested information is already updated. As b is assumed to vary slowly, there is normally no need to perform the solving at every bias observation i. One can decide to solve the equations at regular time intervals, or to do it by an external trigger. It is thus not necessary that the equations are solved periodically. An operator may therefore intervene with an automatic trigger mechanism and request additional updates of bias parameters. The solution is subsequently sent to the tracking system, and one can proceed updating the left and right hand sides of the expression (22).

Just as the inverse of v is the a priori covariance matrix, the covariances $P_b$ of the estimated bias parameters are given by $(U+i,)^{-1}$ and these quantities are thus easily provided to the tracking system. For most practical purposes it suffices to take the diagonal elements of $(U+v)^{-1}$ as the squared uncertainties of the corresponding parameter.

Figure 4:
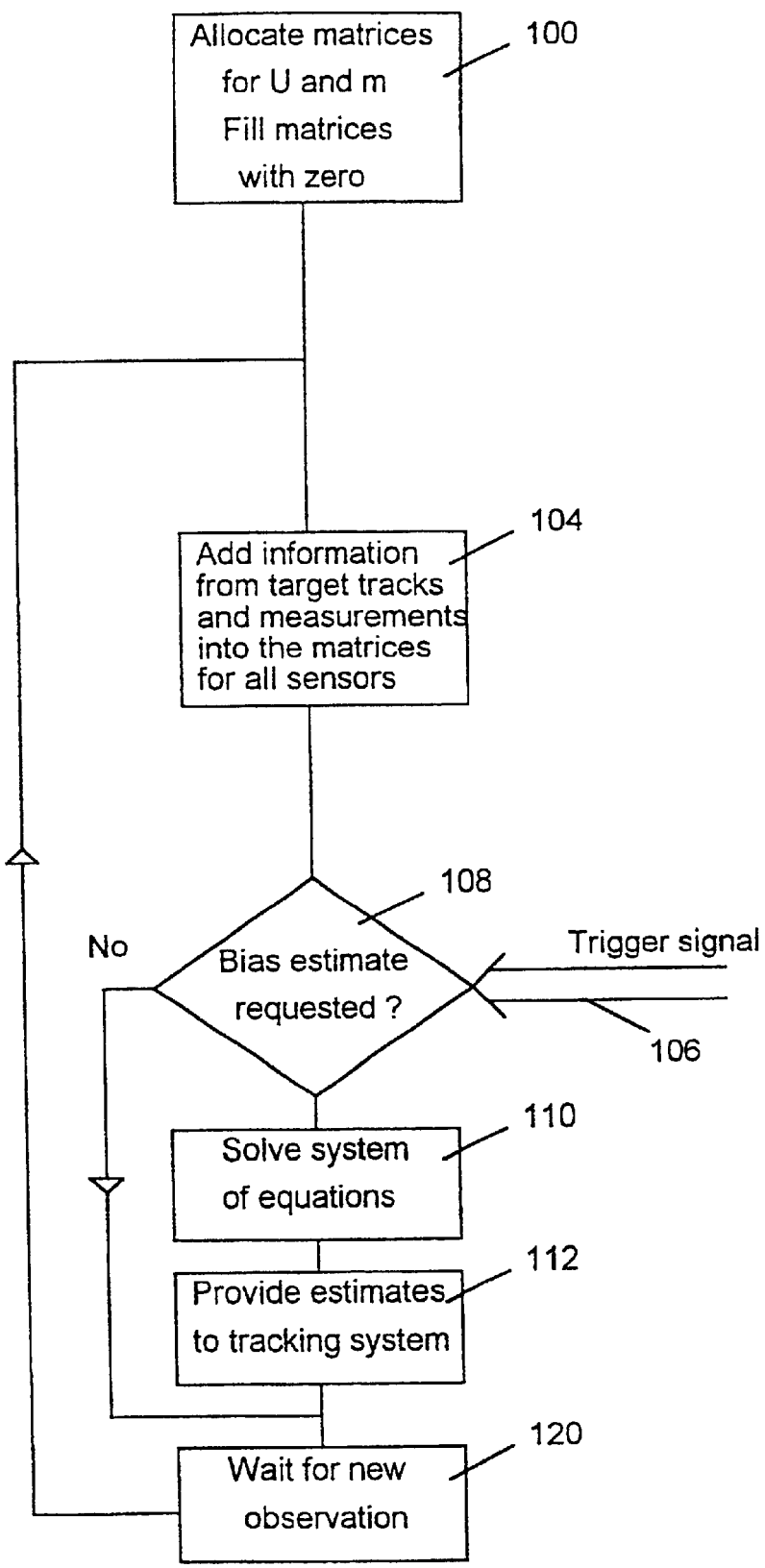
FIG. 4 shows the information flow in an embodiment of the automatic alignment function according to the present invention.

The flow of the calculations is illustrated in FIG. 4. The process starts in step 100 with a matrix allocation. If the total number of bias parameters is n, an n×n matrix for U and an n×1 matrix for m are allocated. In step 100, these matrices are also filled with zeros.

As a track and its associated measurements enter the alignment estimator, the design matrix $A_{is}$, the projection matrix $H_{is}$ and the other quantities required for the expressions (23) and (24) are computed in 104. These are added to U and m. This is repeated for each corresponding sensor. The matrices U and m are thus progressively filled with more and more data.

If a trigger signal 106 arrives, manually or automatically, indicating the need for an updated bias vector in step 108, then the system of equations $(U+v)\Delta b = m$ is solved for $\Delta b$ in step 110. If required, also the inverse of U+v is calculated to get the variances of b. In step 112, b and its uncertainties are provided to the tracking system.

In step 120, the next bias observation is awaited, and when it arrives, the process returns to step 104 for a new repetition.

It should be noted, in connection with the issue of selecting the nominal true positions $\hat{x}_i$, then in some cases it may happen that the true target locations are indeed known. This may be the case if calibration points are available, or if satellite navigation data are so accurate that they may be regarded as truth. In this case one should of course use the true positions as $x_i$. There is then no need to minimise with respect to $x_i$, and the subsequent calculations are thus simplified considerably.

The procedure described so far has the limitation that only completely static bias parameters can be handled properly. The system bases its estimates on the complete history of data, so recent changes will have little impact on the estimates. One way of handling drifting bias parameters would be to restart the processing at certain time intervals, e.g. one hour. The drawback of such an approach is that some sensors may not provide data continually, and so any estimates for these would be forgotten. Moreover, the batches should be short for rapidly varying parameters, while they should be long for obtaining reliable estimates where data are sparse. These are contradictory requirements.

A preferred embodiment of the present invention thus involves a process which gradually supresses old data. To this end the preferred embodiment of the present invention includes "process noise" to model time dependence of the parameters. This results in that the system gradually forgets past data. The time constant is selectable individually for each parameter. Some parameters are likely to vary slowly, like the location of a fixed sensor, and some parameters may vary more rapidly, like e.g. time delays due to congestion of data communication. At regular time intervals, the left and right hand sides of expression (22) are modified to incorporate process noise. It is then important to add v only just before solving the expression (22), otherwise the a priori data would fade away.

The inclusion of process noise amounts in a preferred embodiment to adding a noise covariance matrix Q to the covariance matrix $U^{-1}$. The resulting U is expressed as $$\tilde{U} = (U^{-1} + Q)^{-1} = [U^{-1}(I+UQ)]^{-1} = (I+UQ)^{-1}U \tag{25}$$

where the tilde denotes a quantity after adding noise.

The solution of Ub=m should not be changed when adding the noise, so the right hand side must be multiplied with the same factor as U:

$$\tilde{m} = (I+UQ)^{-1}m \tag{26}$$

In general U is not invertible. Although the motivation of (25) and (26) did require invertibility, the end results do not, and it is an assumption that they are valid in all cases.

The question how to define Q still remains. A convenient way to perform this is to define a time constant $\tau$ for each bias parameter. If the a priori uncertainty for that parameter is $$\delta_i = (v_{ii})^{-1/2}, \tag{27}$$

then an assumption that the added variance during the time interval Δt is $$Q_{it} = \frac{\Delta t}{\tau_i} \frac{I}{v_{it}} \quad (28)$$

is made, that is, the variance grows linearly with time.

As the inclusion of process noise implies the inversion of a large matrix, this should not be performed more often than necessary. The order of magnitude of the time interval for the process noise calculations should preferably be the same as the shortest time constant of the involved bias parameters. The triggering mechanisms for the process noise inclusion may be automatic or manual, or a combination thereof, but preferably substantially periodical.

In a practical implementation of the present invention, one should generally not use all the incoming measurements. Therefore, in a preferred embodiment the incoming measurements should be sorted by a set of filters. The filtering in the preferred embodiment will consider the following issues.

One must make sure that the measurements are correctly associated to the track. If there is a case of ambiguous association (as detected by the association algorithms in the tracker) the measurement should be discarded. The tracker often gives information about the quality of the association, so a simple comparison of such a measure with a threshold value in such a case is enough.

Furthermore, the track should be in a state of reliable tracking and in reasonably uniform motion. This request is in order to ascertain that the given nominal position and velocity are close to the true values.

One must make sure that no measurement is used twice, that is, in two different sets i. Furthermore, one should discard measurements that are too old. The measurements included in a set i should be at sufficiently close times. This ensures that the procedure of bringing the set to a common nominal time, described above, is valid.

In reality it may happen that there is an abundance of measurements in one area (e.g. around an airport) while other areas give very few measurements. In such a case, the algorithm tends to optimise the bias estimation results over the set of measurements, rather than over the complete coverage area. It may, however, be desirable that the system provides good estimates whether the traffic is dense or sparse. If this is the case, it may be preferable to give extra weight to the measurements in the sparse areas, for example by not using all incoming data from the dense areas.

As a final assurance that the associated measurements belong to the same target, a certain fraction (e.g. 10%) of the bias observations should be discarded based on the size of, for example, the quantity $d_{is}^2 = \|d_{is} - \bar{d}_{is} - (A_{is} - \bar{A}_{is})(b - \hat{b})\|^2$, (cf. equation (21), where now b stands for the currently valid bias vector rather than for an unknown).

After a filtering process according to the above suggestions, the remaining filtered set of measurements and tracks are behaving well, and this in turn ensures that the used approximations are valid.

Figure 5:
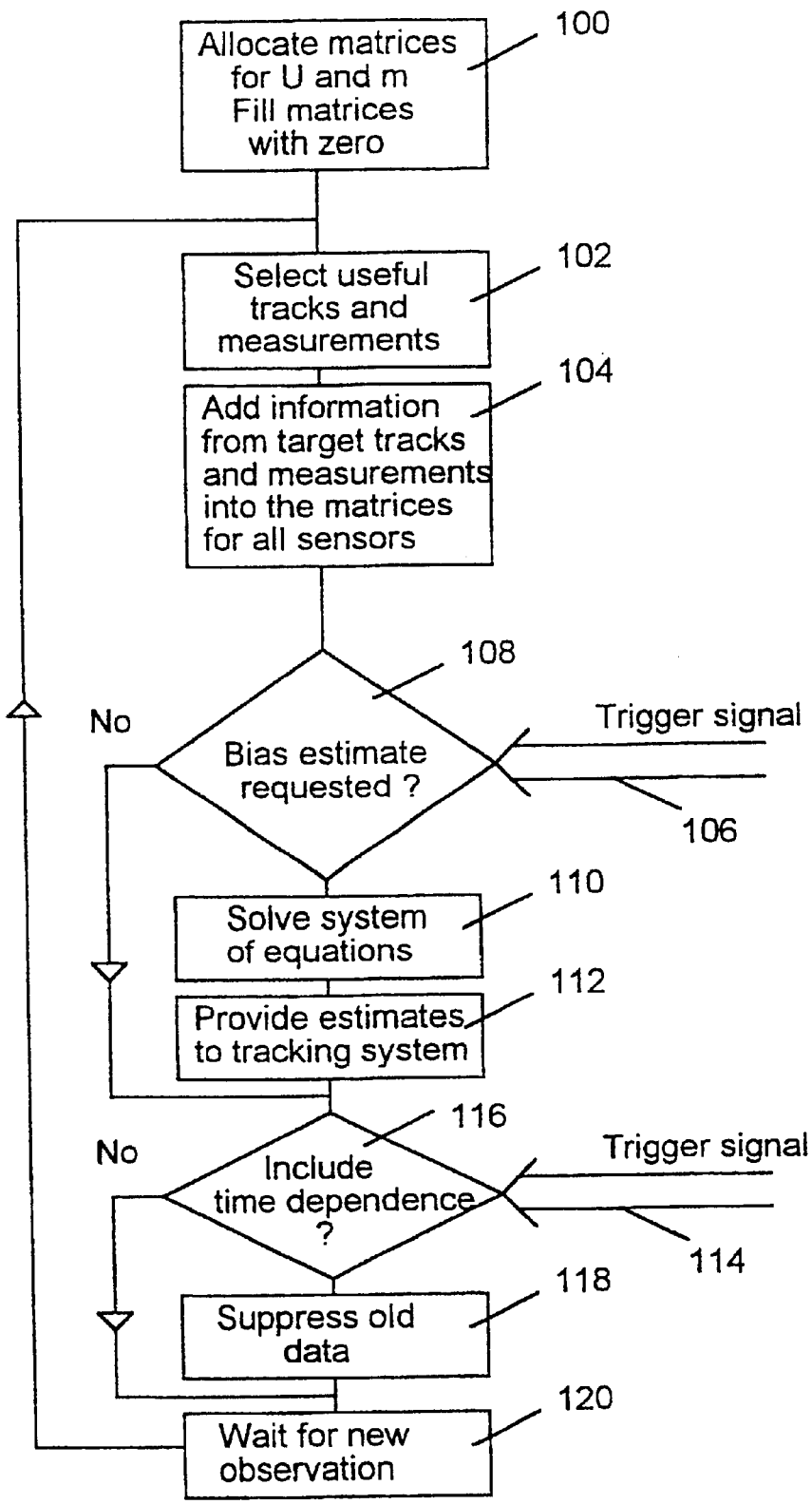
FIG. 5 shows the information flow in an alternative and preferred embodiment of the automatic alignment function according to the present invention.

In a preferred embodiment, the above steps of time dependence introduction and measurement filtering are included in the alignment process. FIG. 5 illustrates the flow of information in such a case. This flow of information is very similar to that shown in FIG. 4, so therefore only the differences will be described.

When the measurements becomes available to the automatic alignment section, the process enters into step 102. In this step, the above described filtering of the measurements takes place and the information that is added into the matrices in step 104 is the filtered, well behaving measurements.

When the process has passed the point, where a bias estimate could be requested, i.e. steps 108–112, the time dependence may be entered. Since the calculations in this respect are quite time consuming, this part should not be performed every time the process comes to this point. Thus, in step 116, the process determines if there is a request for including the time dependence in the measurements data. This is determined by a trigger signal 114, which may be supplied automatically or manually. If that is the case, the process enters into step 118, which suppresses the older data according to the above described routines. More specifically, U and m are recomputed using (25) and (26). The flow then continues at step 120.

EXAMPLE

Figure 6:
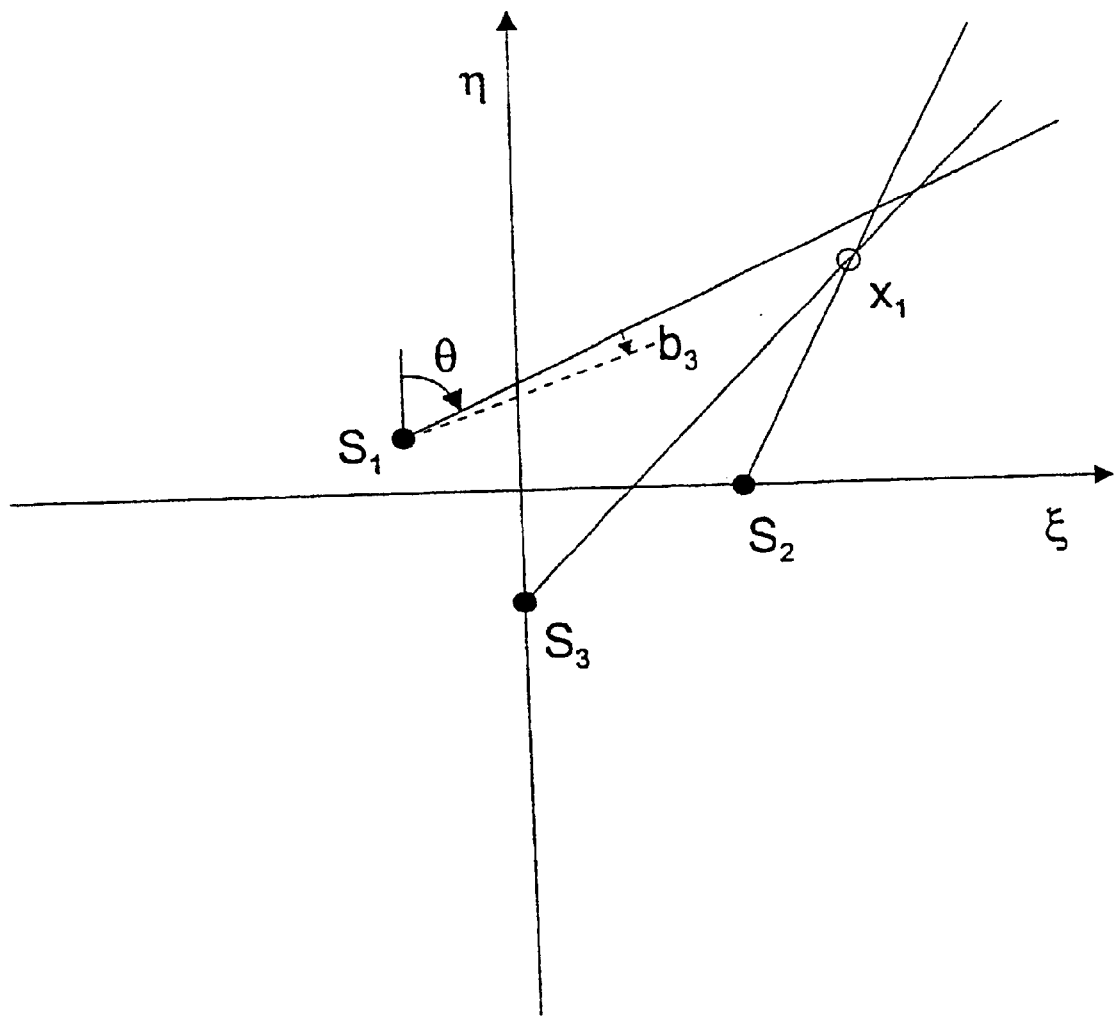
FIG. 6 shows an example of a tracking situation, where automatic alignment according to the present invention is applied, with one target present in the area of detection.

A simple example, with references to FIG. 6, will clarify the algorithms and also illustrate some properties of the invention. Consider a situation where three passive sensors are located on a flat earth described by a Cartesian coordinate system $(\xi,\eta)$. Each of the sensors measures the direction θ to the target. As is common practice, θ is measured from the η axis in the clockwise direction. Three bias parameters are considered for each sensor s: Sensor location errors $b_{s\xi}$ and $b_{s\eta}$, and a north alignment error (azimuth error), $b_{s\theta}$. All bias parameters are taken together in the bias vector $b=(b_{1\xi}\ b_{1\eta}\ b_{1\theta}\ b_{2\xi}\ b_{2\eta}\ b_{2\theta}\ b_{3\xi}\ b_{3\eta}\ b_{3\theta})^T$ The nominal footpoint of the sensor s is denoted $x_{s0}=(\xi_{s0}, \eta_{s0})$. The transformation $h_s(x,b)$, which takes target locations $x=(\xi,\eta)$ down to the measurement space of sensor s, runs $$h_s(x, b) = \arctan\left(\frac{\xi - (\xi_0 + b_{s\xi})}{\eta - (\eta_{s0} + b_{s\eta})}\right) - b_{s\theta} \quad (27)$$

where it is understood that ±π may have to be added to put θ in the right quadrant.

The following conditions are assumed. The sensor nominal locations are: $x_{10}=(-10,5)$, $x_{20}=(20,0)$ and $x_{30}=(0,-10)$ kilometres. The measurement noise is 0.005 radians for all sensors, that is, the measurement information matrices $\mu_{is}$ are all $4.10^4$ rad$^{-2}$. The a priori bias uncertainties are 0.1 km for all locations, and 0.02 radians for all north alignment errors, so the a priori information matrix is v=diag(100 100 2500 100 100 2500 100 100 2500). The actual bias errors are all zero except for the north alignment of sensor 1, $b_3$, which is 0.02 rad. (This is exaggerated in FIG. 6). For simplicity, all measurements pertaining to the same occasion are at the same time, and the bias vector that one expands about is zero.

The first observation stems from a target at location $x_1=(30,20)$. To keep the notation simple, henceforth observation index i=1 is dropped. The measurement is given by equation (27) applied to the true location and the true bias vector, and then distorted by measurement noise. In this example, however, no measurement noise is added. (The results will be easier to interpret this way. By adding a long sequence of measurements, the effect of the noise will anyway be smoothed out.) The obtained measurements can then be computed as $y_1=1.192, y_2=0.464, y_3=0.785$ radians. The true position is unknown to the system, but an approximate nominal position is assumed to be available: $\hat{x}=(30.1, 19.8)$ km.

Now, the projection matrices are computed by differentiating equation (27) at the nominal target position and assumed zero bias vector:

$H_1$=(0.008–0.022)

$H_2$=(0.04–0.02)

$H_3$=(0.017–0.017)

Likewise, the design matrices are computed by differentiating (27) with respect to the bias parameters:

$A_1$=(−0.008 0.022 −1 0 0 0 0 0 0)

$A_2$=(0 0 0 −0.04 0.02 −1 0 0 0)

$A_3$=(0 0 0 0 0 0 −0.017 0.017 −1)

Also the nominal positions in measurement space are calculated by applying (27) to the nominal target position in target space x and zero bias vector:

$\hat{y}_1$=1.217

$\hat{y}_2$=0.472

$\hat{y}_3$=0.79

The differences between actual and nominal measurements are:

$d_1$=−0.025

$d_2$=−0.008

$d_3$=−0.005

Next one needs (cf. (18))

$$\left(\sum_s H_s^T u H_s\right)^{-1} = \begin{pmatrix} 0.044 & 0.047 \\ 0.047 & 0.072 \end{pmatrix}$$

Hereby the barred versions of $d_s$ and $A_s$ can be computed:

$\bar{d}_1$=−0.022

$\bar{d}_2$=−0.006

$\bar{d}_3$=−0.012

$\bar{A}_1$=(−0.007 0.018 −0.835 0.005 −0.002 0.113 −0.006 0.006 −0.353)

$\bar{A}_2$=(0.0009 −0.002 0.113 −0.037 0.019 −0.922 −0.004 0.004 −0.243)

$\bar{A}_3$=(−0.003 0.008 −0.353 −0.01 0.005 −0.243 −0.004 0.004 −0.242)

This is all that is needed to calculate U from (23) and m from (24). Equation (22) can now be solved with the result b=(0.0006 −0.002 0.003 0.002 −0.001 0.002 −0.003 0.003 −0.007)$^T$ The positional parameters are small, as they should be, but the azimuth components ($b_3$, $b_6$, and $b_9$) may at first sight seem like a failure. However, referring to FIG. 6, rotating the strobes from sensor 1 and 2 clockwise, and rotating the strobe from sensor 3 counterclockwise would indeed compensate for the bias errors visible in this situation. This sole set of measurements cannot uniquely determine the parameters, which also follows from the fact that there are nine unknown parameters, and only three measured quantities, The algorithm finds values for the parameters that make the strobes meet in the least expensive way in terms of consistency with the a priori data.

Figure 7:
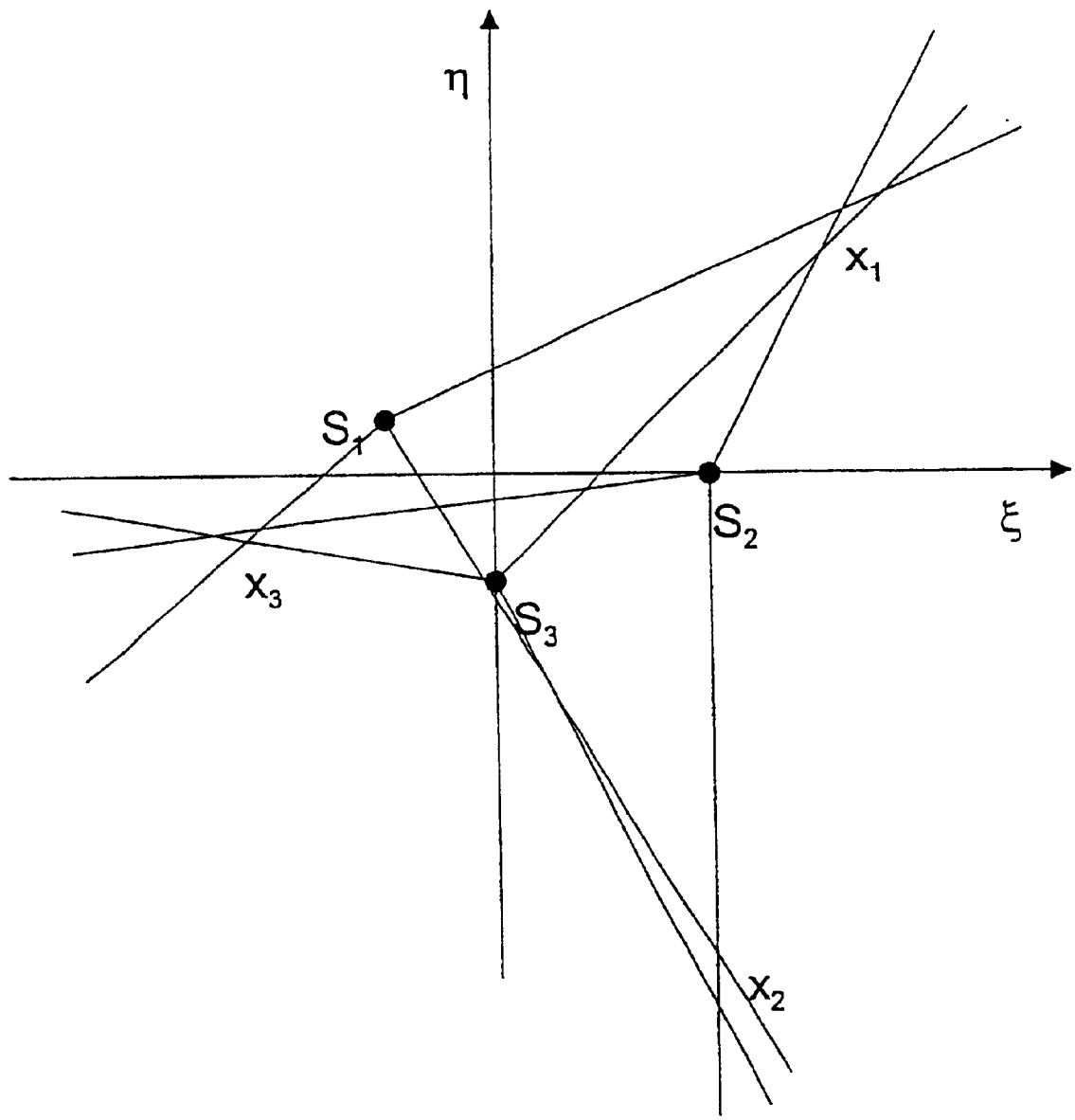
FIG. 7 shows an example of a tracking situation, where automatic alignment according to the present invention is applied, with several targets present in the area of detection.

To get better estimates one should add more data. In FIG. 7 there are two more bias observations, and it now appears more clearly that it is the strobes from sensor 1 that need correction. The true target locations are $x_2$=(20,−50) and $x_3$=(−25,−5) km, and the nominal locations are $\hat{x}_2$=(20.2,−50.1) and $\hat{x}_3$=(−24.9,−5.2). These are the data that are needed to repeat the calculations shown above. After adding the contributions to U and m and solving together with v, the result runs b=(−0.008 −0.001 0.015 −0.004 0.001 −0.002 0.012 −0.0004 −0.004)$^T$ which clearly singles out $b_3$ with 15 mrad (true value 20 mrad). In this way, by adding more and more data one can continually improve the estimates.

The uncertainties can be found by inverting U+v, and taking the square roots of the diagonal elements. These are δb=(0.099 0.100 0.010 0.099 0.099 0.008 0.097 0.099 0.010)$^T$ The measurements thus have so far done very little to improve the location estimates beyond the a priori data, while the north alignment uncertainties have been cut down by a factor 2. So, e.g., $b_3$ has been narrowed in from 0±20 mrad to 15±10 mrad.

The present invention is a method with several attractive properties. It handles a multitude of sensors of different characteristics. It even works if all sensors are of a passive type. The method uses targets of opportunity for the estimation and there is no need for special calibration targets. Furthermore, the method does not require that any of the sensors is used as a reference. The present invention provides updated estimates as often as requested by the tracking system. The first estimates can be obtained based on very few measurements. The estimates are improved as more measurements enter the system. Moreover, the method allows for defining a time constant for each bias parameter, handling the measurement history, so that some parameters are regarded as almost stationary while others may be varying more rapidly. Finally, measurements alone do not always contain enough information for unambiguous bias estimates, which is often reflected in singularities and numerical instability in traditional methods. The present invention utilises a priori data that removes this problem.

Although a preferred embodiment of the present invention have been described in detail, the scope of the invention should not be limited thereto, but should instead solely be limited by characterising part of the following claims.

What is claimed is:

1. A bias estimating method for a target tracking system, comprising the steps of:

collecting target tracks (T) and associated measurements (M) from said target tracking system;

calculating estimates of bias parameters (b) based on said target tracks (T) and associated measurements (M);

providing said target tracking system with said calculated estimates of bias parameters (b), characterized in that the calculating step comprises the steps of:

generating an error function, comprising at least two terms, where a first term is dependent of at least the magnitude of the discrepancy between measurements and a measuring model, where the measuring model is a model function of an unknown target position and unknown bias parameters, and where a second term is dependent of at least predetermined evaluations of the a priori statistical distributions of the bias errors (15) and said unknown bias parameters; and minimising said error function with respect to said bias parameters as well as said target position.

2. A bias estimating method for a target tracking system, comprising the steps of:

collecting target tracks (T) and associated measurements (M) from said target tracking system;

calculating estimates of bias parameters (b) based on said target tracks (T) and associated measurements (M);

providing said target tracking system with said calculated estimates of bias parameters (b), wherein, the calculating step comprises the steps of:

generating an error function, comprising at least two terms, where a first term is dependent of at least the magnitude of the discrepancy between measurements and a measuring model, where the measuring model is a model function of an unknown target position and unknown bias parameters, and where a second term is dependent of at least predetermined evaluations of the a priori statistical distributions of the bias errors (15) and said unknown bias parameters; and minimising said error function with respect to said bias parameters as well as said target position, and said error function is given by:

$$V = \sum_{i,s} \|y_{is} - h_s(x_{is}, b)\|^2 + f(v, b)$$

where i denotes a bias observation, i.e., a target and its associated set of measurements (M) obtained by different sensors, s denotes the sensor giving said measurements (M) of said target, $x_{is}$ is the location of said target at the time corresponding to said measurement (M), b is a vector containing all bias parameters of all sensors, $h_s$ is a projection function expressing said target position in the coordinate system employed by said sensor, taking the effects of the bias parameters (b) into account, $f$ is a matrix dependent function, $y_{is}$ said measurement by said sensor s of said target, $\|\cdot\|$ is a norm defined by $\|q\|^2 = q^T u q$, where q is any vector in measurement space, and u is the inverse of the measurement covariance matrix, $u = R_{is}^{-1}$, for said target and said measurement, and v is the inverse of the covariance matrix describing said predetermined error distributions.

3. A bias estimation method according to claim 2, characterized in that said error function is given by:

$$V = \sum_{i,s} \|y_{is} - h_s(x_i + r_i(t_{is} - t_i), b)\|^2 + f(v, b)$$

where $t_{is}$ is the time corresponding to said measurement, $t_i$ is a time near the different $t_{is}$, $x_i$ is the location of said target at time $t_i$, and $r_i(\cdot)$ is a function such that the target location at time $t_{is}$ is given by $x_i(t_{is}) = x_i + r_i(t_{is} - t_i)$.

4. A bias estimation method according to claim 3, characterized in that said error function is given by:

$$V = \sum_{i,s} \|y_{is} - h_s(x_i + r_i(t_{is} - t_i), b)\|^2 + (b - \hat{b})^T v(b - \hat{b})$$

where $\hat{b}$ is an approximation of the bias vector.

5. A bias estimation method according to claim 1, characterized in that said target tracks (T) and associated measurements (M) are derived using information from at least two sensors.

6. A bias estimation method according claim 1, characterized in that said minimising step comprises the step of linearising relevant quantities with respect to said target position and said bias parameters (b).

7. A bias estimating method for a target tracking system, comprising the steps of:

collecting target tracks (T) and associated measurements (M) from said target tracking system;

calculating estimates of bias parameters (b) based on said target tracks (T) and associated measurements (M);

providing said target tracking system with said calculated estimates of bias parameters (b), wherein, the calculating step comprises the steps of generating an error function, comprising at least two terms, where a first term is dependent of at least the magnitude of the discrepancy between measurements and a measuring model, where the measuring model is a model function of an unknown target position and unknown bias parameters, and where a second term is dependent of at least predetermined evaluations of the a priori statistical distributions of the bias errors (15) and said unknown bias parameters, and minimising said error function with respect to said bias parameters as well as said target position;

said minimising step comprises the step of linearising relevant quantities with respect to said target position and said bias parameters (b); and said linearising step is performed via a Taylor series expansion of $h_{is}$ with respect to said target position about a nominal position $\hat{x}_i$; and with respect to said bias parameters about the approximate bias vector $\hat{b}$, according to $$h_s(x_i + r_i(t_{is} - t_i), b) \approx \hat{y}_{is} + H_{is} \cdot (x_i - \hat{x}_i) + A_{is} \cdot (b - \hat{b})$$

with $$\hat{y}_{is} = h_s(\hat{x}_i + \hat{r}_i(t_{is} - t_i), \hat{b})$$

$$H_{is} = \left. \frac{\partial h_s(x_i, \hat{b})}{\partial x_i} \right|_{x_i = \hat{x}_i + \hat{r}_i(t_{is} - t_i)}$$

$$A_{is} = \left. \frac{\partial h_s(\hat{x}_i + \hat{r}_i(t_{is} - t_i), b)}{\partial b} \right|_{b = \hat{b}},$$

and $\hat{r}_i(\cdot)$ is an approximation of $r_i(\cdot)$.

8. A bias estimation method according to claim 7, characterized in that the nominal position $\hat{x}_i$ as well as the function approximation $\hat{r}_i$ are obtained from the said target track state (T).

9. A bias estimation method according to claim 6, characterized in that said minimising step comprises the step of linearising with respect to said bias parameters around zero.

10. A bias estimation method according to claim 7, characterized in that the calculating step comprises the steps of:

forming matrices U and m and initiating said matrices to zero;

when a new bias observation is made, computing $$m_i = \sum_s (A_{is} - \overline{A}_{is})^T u_{is} (d_{is} - \overline{d}_{is}),$$

and $$U_i = \sum_s (A_{is} - \overline{A}_{is})^T u_{is}(A_{is} - \overline{A}_{is})$$

for all sensors s, where $d_{is} = y_{is} - \hat{y}_{is}$, $$\overline{d}_{is} = H_{is}\left(\sum_t H_{it}^T u_{it} H_{it}\right)^{-1} \sum_t H_{it}^T u_{it} d_{it},$$

$$\overline{A}_{is} = H_{is}\left(\sum_t H_{it}^T u_{it} H_{it}\right)^{-1} \sum_t H_{it}^T u_{it} A_{it};$$

and
adding $U_i$ to U and $m_i$ to m.

11. A bias estimation method according to claim 10, characterized in that the calculating step further comprises the step of solving the system of equations $(U+v)(b-\hat{b})=m$ for b.

12. A bias estimation method according to claim 11, characterized in that said solving step is performed solely when requested for by a trigger signal (14).

13. A bias estimation method according to claim 12, characterized in that said trigger signal (14) is time dependent.

14. A bias estimation method according to claim 12, characterized in that said trigger signal (14) is provided by an operator.

15. A bias estimation method according to claim 12, characterized in that said trigger signal (14) is provided depending on the number of bias observations.

16. A bias estimation method according to claim 11, characterized in that the step of providing calculated estimates further comprises the step of providing $(U+v)^{-1}$ as the covariance matrix giving the uncertainties of b ($P_b$).

17. A bias estimation method according to claim 1, characterized in that said calculating step further comprises the step of time dependence introduction by suppressing old data in said set of target tracks (T) and associated measurements (M).

18. A bias estimation method according to claim 17, characterized in that said time dependence introduction step comprises limitation of the number of bias observations used in the calculations.

19. A bias estimation method according to claim 18, characterized in that said time dependence introduction step comprises, at certain time intervals Δt, incorporation of a noise covariance matrix Q in U and m, according to:

$U:=(I+UQ)^{-1}U$ $m:=(I+UQ)^{-1}m$ where I is the identity matrix.

20. A bias estimation method according to claim 19, characterized in that the matrix Q is a diagonal matrix with elements $$Q_{kk} = \frac{\Delta t}{\tau_k v_{kk}}$$

where $\tau_k$ is the time constant of the $k^{th}$ bias parameter, and $v_{kk}$ is defined by $\delta_k = (v_{kk})^{-1/2}$ where $\delta_k$ is said a priori distributions of the bias error k, to account for drift of bias parameters.

21. A bias estimation method according to claim 1, characterized in that said calculating step further comprises the step of selecting useful target tracks (T) and measurements (M) for use in the minimizing step.

22. A bias estimation method according to claim 21, characterized in that said selection step is based on at least one of the following criteria:

unambiguous association of measurement (M) with a track (T);

target track (T) is in uniform motion;

measurements (M) within an observation are well gathered; and target tracks (T) are evenly distributed over the area of detection.

23. A bias estimation method according to claim 1, characterized in that at least one of said bias parameters (b) are selected from the list of:

time offset;

altitude;

east location;

north location;

east axis tilt;

north axis tilt;

north alignment;

range offset;

range gain;

antenna roll;

antenna pitch; and mode C bias at various locations.

* * * * *

UNITED STATES PATENT AND TRADEMARK OFFICE
CERTIFICATE OF CORRECTION

PATENT NO. : 6,359,586 B1
DATED : March 19, 2002
INVENTOR(S) : Egils Sviestins

It is certified that error appears in the above-identified patent and that said Letters Patent is hereby corrected as shown below:

<u>Title page,</u>
Item [30], Foreign Application Priority Data, change "970412" to -- 9704012 --.

Signed and Sealed this

Fifth Day of November, 2002

*Attest:*

JAMES E. ROGAN
*Attesting Officer*    *Director of the United States Patent and Trademark Office*